INVENTORS
GEORGE W. VON HOFE
JOHN F. SPANO
BY
ATTORNEYS

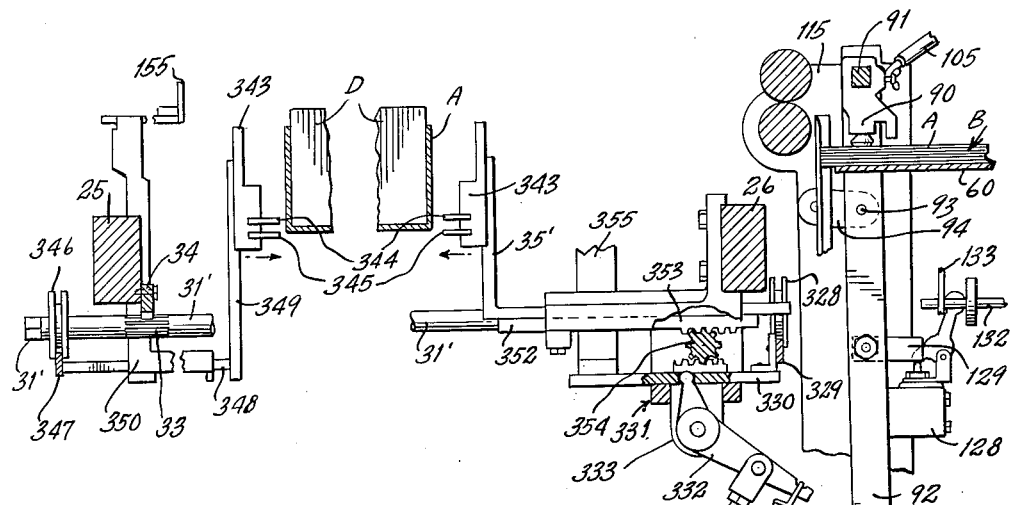
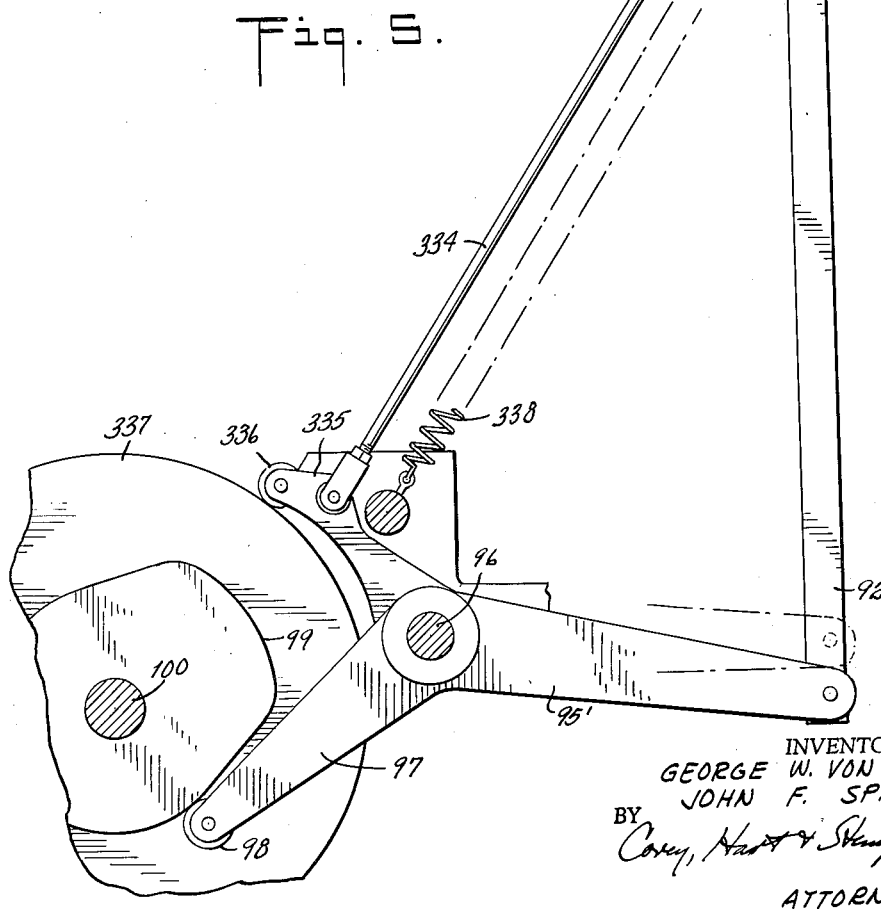
Fig. 5.
INVENTORS
GEORGE W. VON HOFE
JOHN F. SPANO
BY
ATTORNEYS

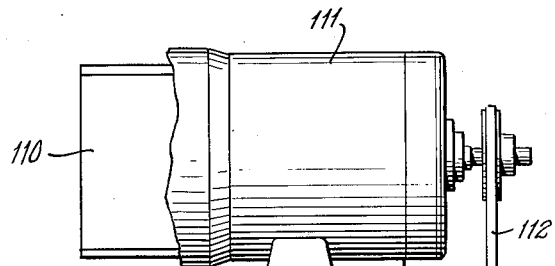
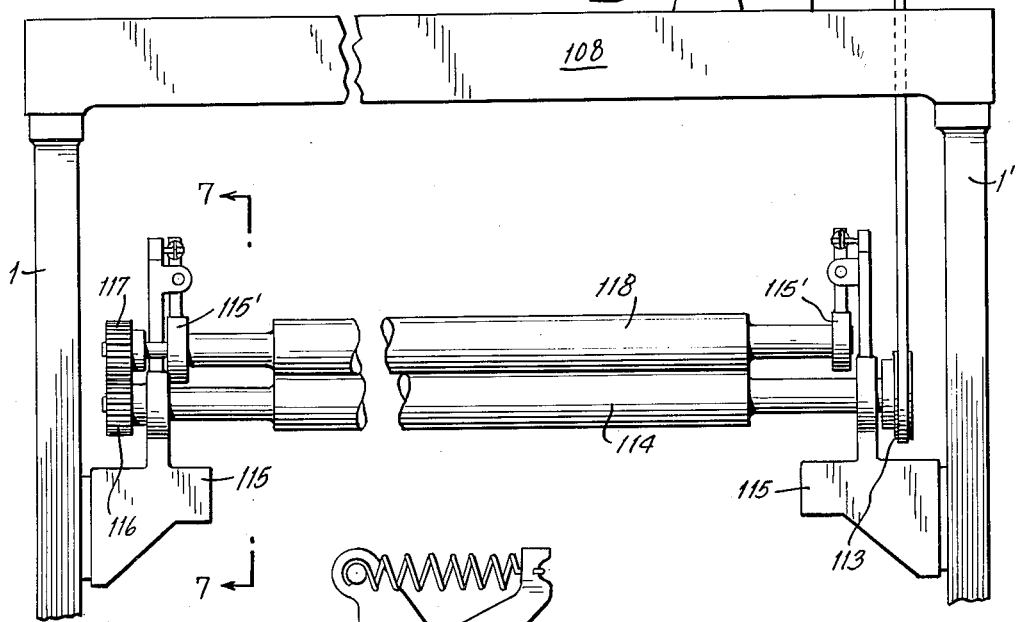
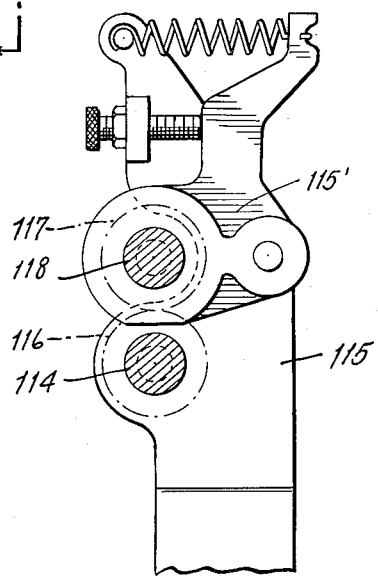

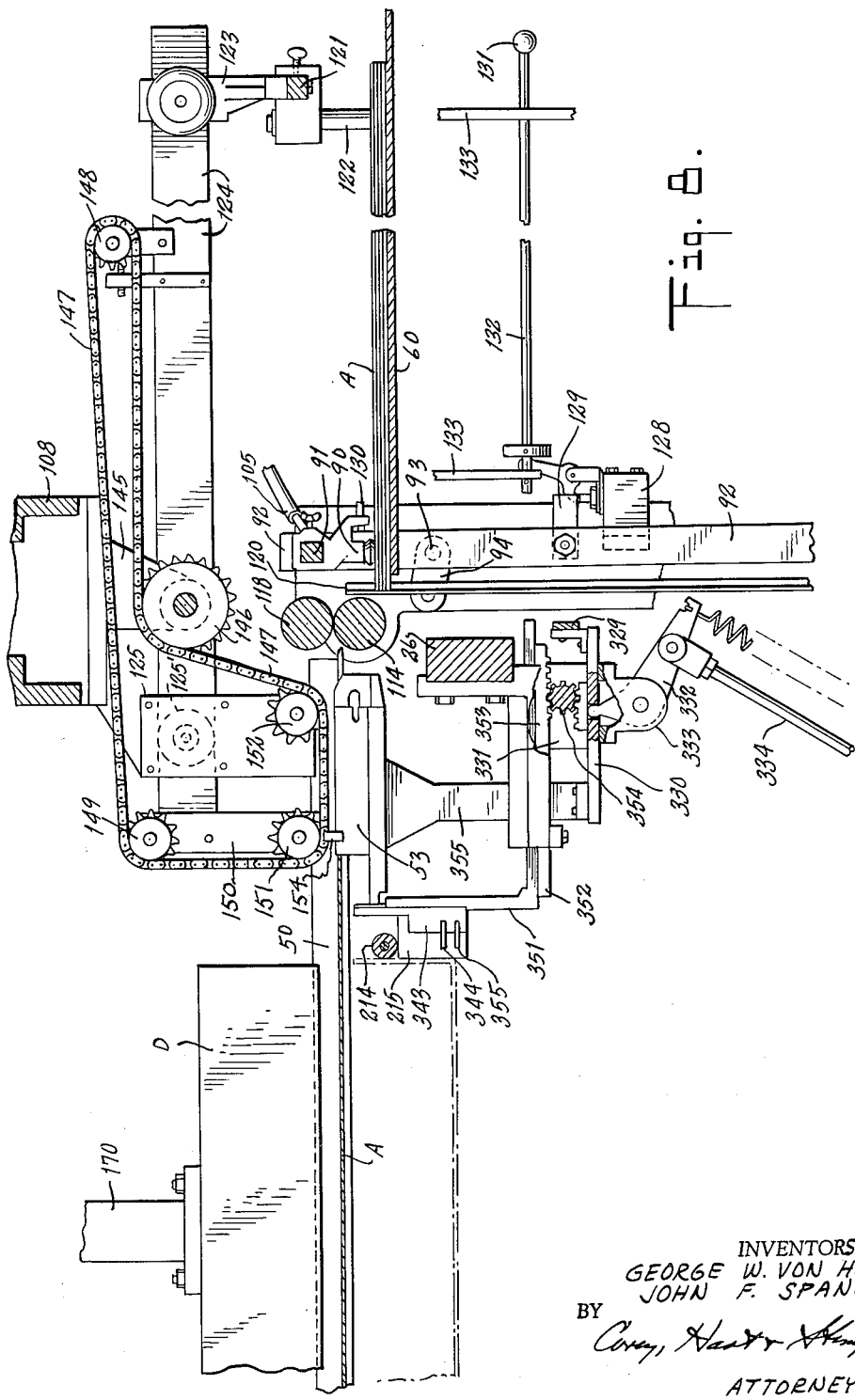

Oct. 9, 1962  G. W. VON HOFE ETAL  3,057,266
BOX MAKING MACHINES
Original Filed April 26, 1957  11 Sheets-Sheet 8
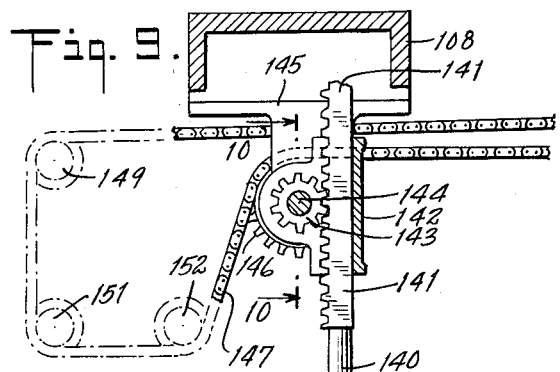
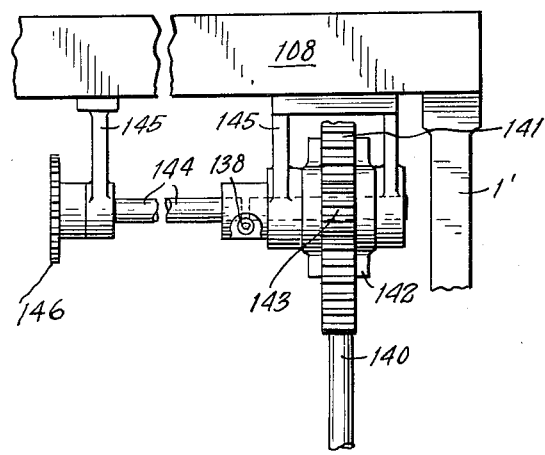
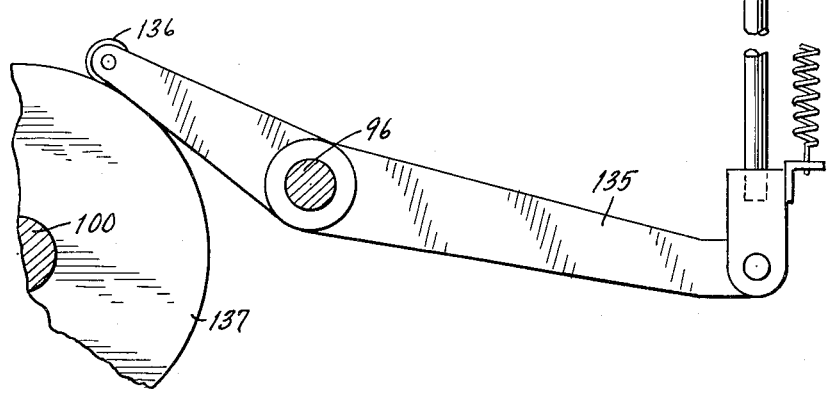
INVENTORS
GEORGE W. VON HOFE
JOHN F. SPANO
BY
ATTORNEYS

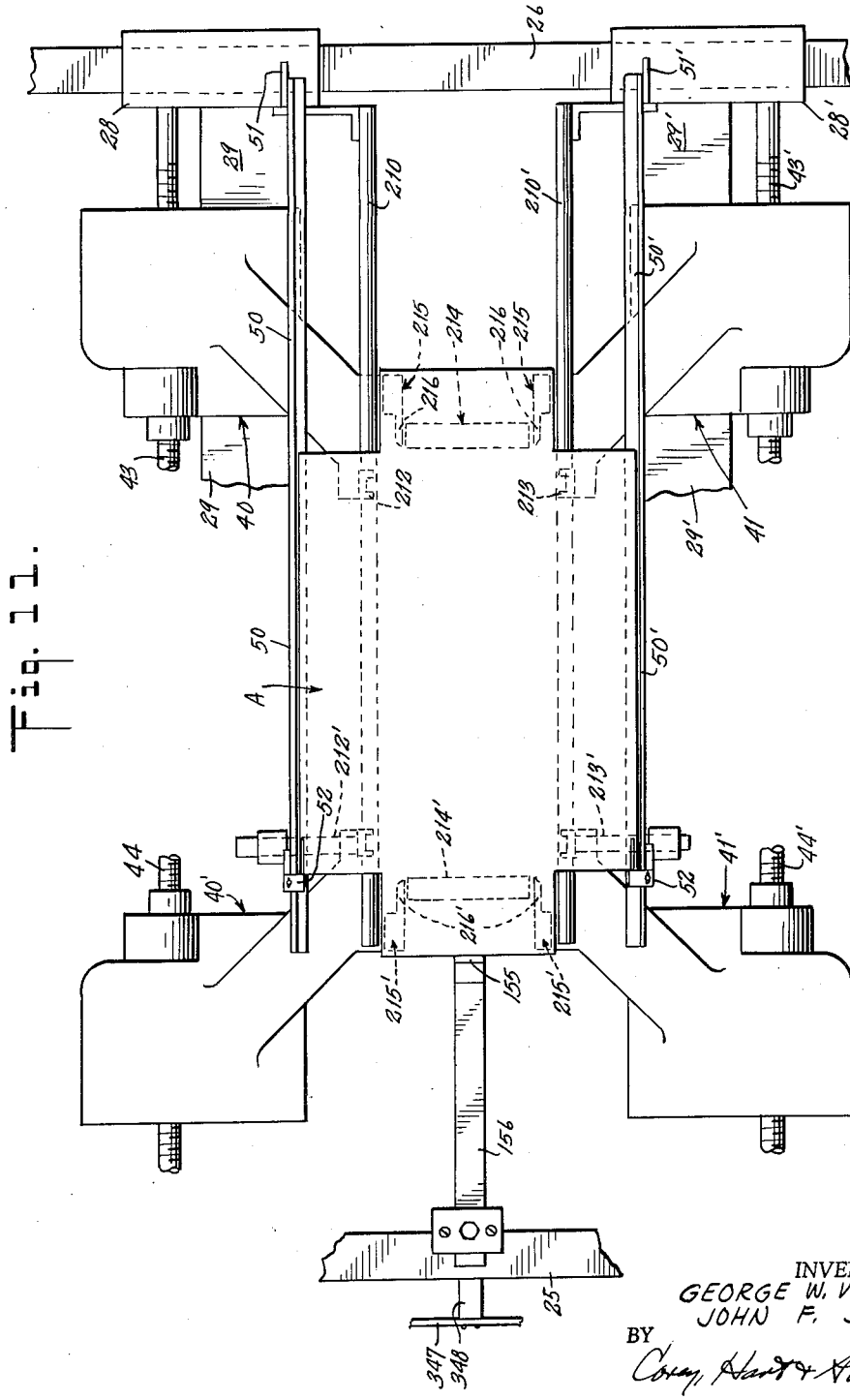

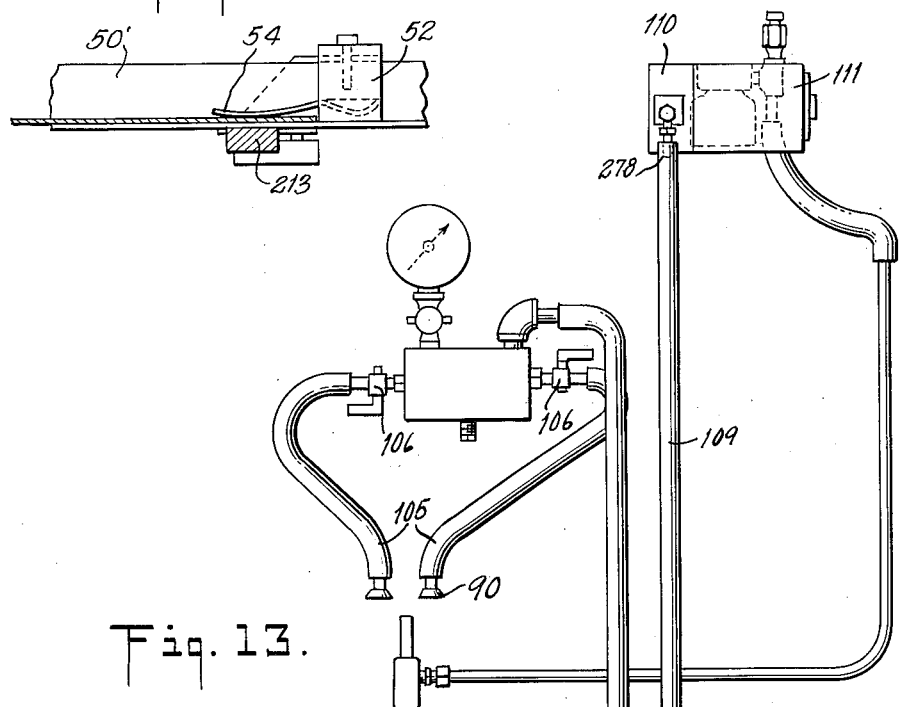
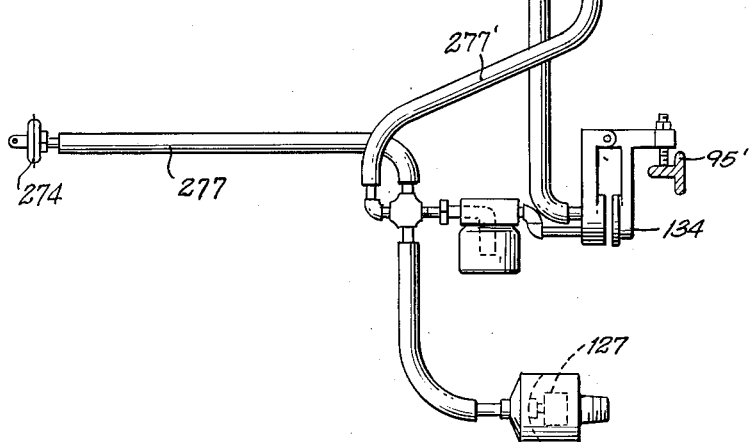

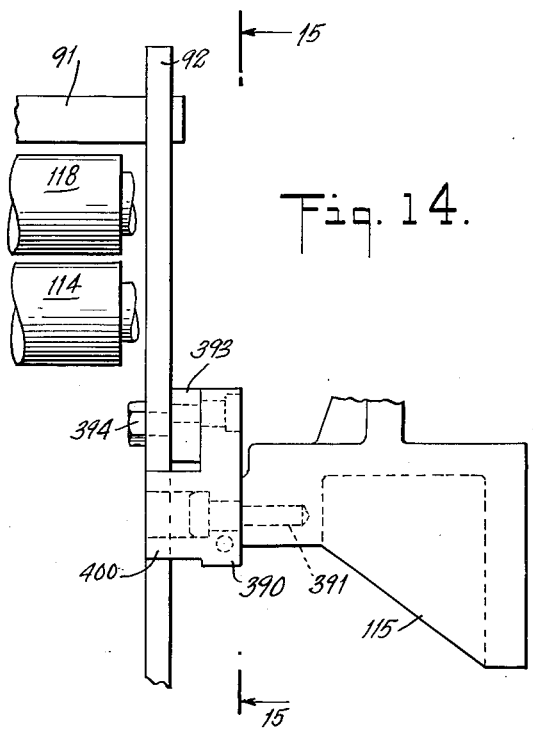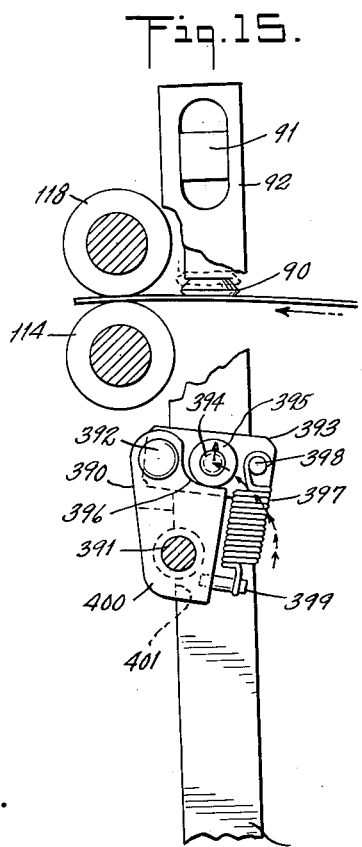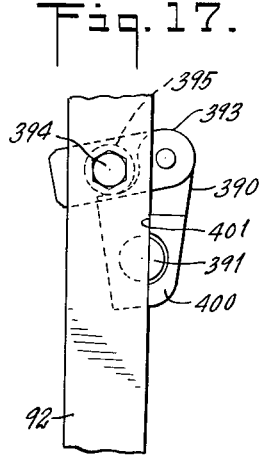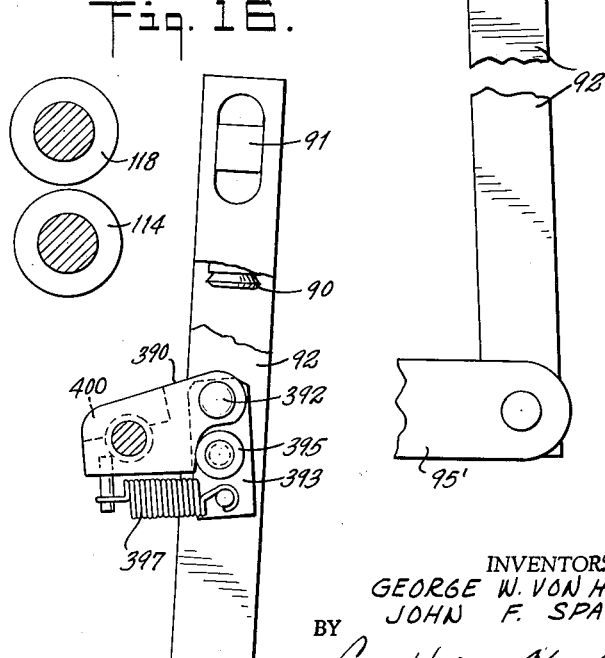

1

3,057,266
BOX MAKING MACHINES
George W. von Hofe, Millington, and John F. Spano, Cresskill, N.J., assignors to New Jersey Machine Corporation, Hoboken, N.J., a corporation of New Jersey
Original application Apr. 26, 1957, Ser. No. 655,214, now Patent No. 2,982,188, dated May 2, 1961. Divided and this application Apr. 5, 1961, Ser. No. 100,837
33 Claims. (Cl. 93—41)

This invention relates to paper box forming machines and has for its primary object the provision of an improved and wholly automatic machine for setting up flat box blanks into box form, simultaneously applying stay strips to all four corners thereof, and discharging the completed boxes therefrom.

Another object of the invention is to provide an improved box making machine which can be readied for manufacturing boxes of widely varying sizes with a minimum of adjustment so that relatively little time is lost in changeovers.

A further object of the invention is to provide a box making machine capable of ejecting stayed box blanks in any one of three directions, thereby enhancing the flexibleness of this type of machine by making it possible to readily couple the same to any one of three different lines of operations for the manufacture of boxes and trays of different sizes.

A still further object of the invention is to provide an improved box making machine which is relatively simple in construction and in which the parts thereof are readily accessible in the event of jam and for adjustment, maintenance and replacement.

A particular object of the invention is to provide in an improved machine of this type wholly automatic means for feeding the blanks and forming them into boxes and for controlling the stay feeding means in the event of failure of the blank feeding means.

This application is a division of application Serial No. 655,214, filed April 26, 1957 issued as Patent No. 2,982,188, dated May 2, 1961, for Box Making Machines. The novel features of construction of the improved box making machine herein and the advantages thereof, will appear from the following description when read in connection with the accompanying drawings which show an illustrative embodiment of the invention and in which FIG. 1 is a perspective view showing a box staying machine made in accordance with the invention, the view looking toward the front and a side of the machine, and some of the parts of the machine shown being eliminated and one of the frame members thereof being broken away to present a clearer illustration of the construction of the machine;

FIG. 5 is a longitudinal vertical sectional view showing the box crimping mechanism and the means for actuating the same;

FIG. 6 is an elevational view showing in enlarged detail the means for feeding the box blanks to the box forming mechanism;

FIG. 7 is a sectional view taken along the line 7—7 of FIG. 6;

FIG. 8 is a longitudinal vertical sectional view showing the mechanism which feeds the box blanks forwardly and which positions such blanks in proper relation to the box forming member;

FIG. 9 is a longitudinal vertical sectional view showing the means for actuating a portion of the blank feeding means;

FIG. 10 is a sectional view taken along the line 10—10 of FIG. 9;

FIG. 11 is a horizontal section showing in plan view the relation of the blank supporting and box forming mechanism to the blocks supporting the stay feeding devices;

FIG. 12 is an enlarged detailed view of a portion of one of the blank registering means;

FIG. 13 is a schematic view showing the air system of the machine;

FIG. 14 is a rear elevational view of a portion of a modified form of mechanism for actuating the blank feeding device and showing embodied in such mechanism a novel compound lever construction;

FIG. 15 is a side elevational view of such blank feeding mechanism, the view being taken along the line 15—15 of FIG. 14, being partly in section and showing the relation of the parts in an advanced position of the mechanism;

FIG. 16 is a view similar to FIG. 15 and shows the relation of the compound lever parts when the mechanism is in a retracted condition; and FIG. 17 is a side elevational view of the composed lever construction when viewed from the back of FIG. 15.

Figure 1:
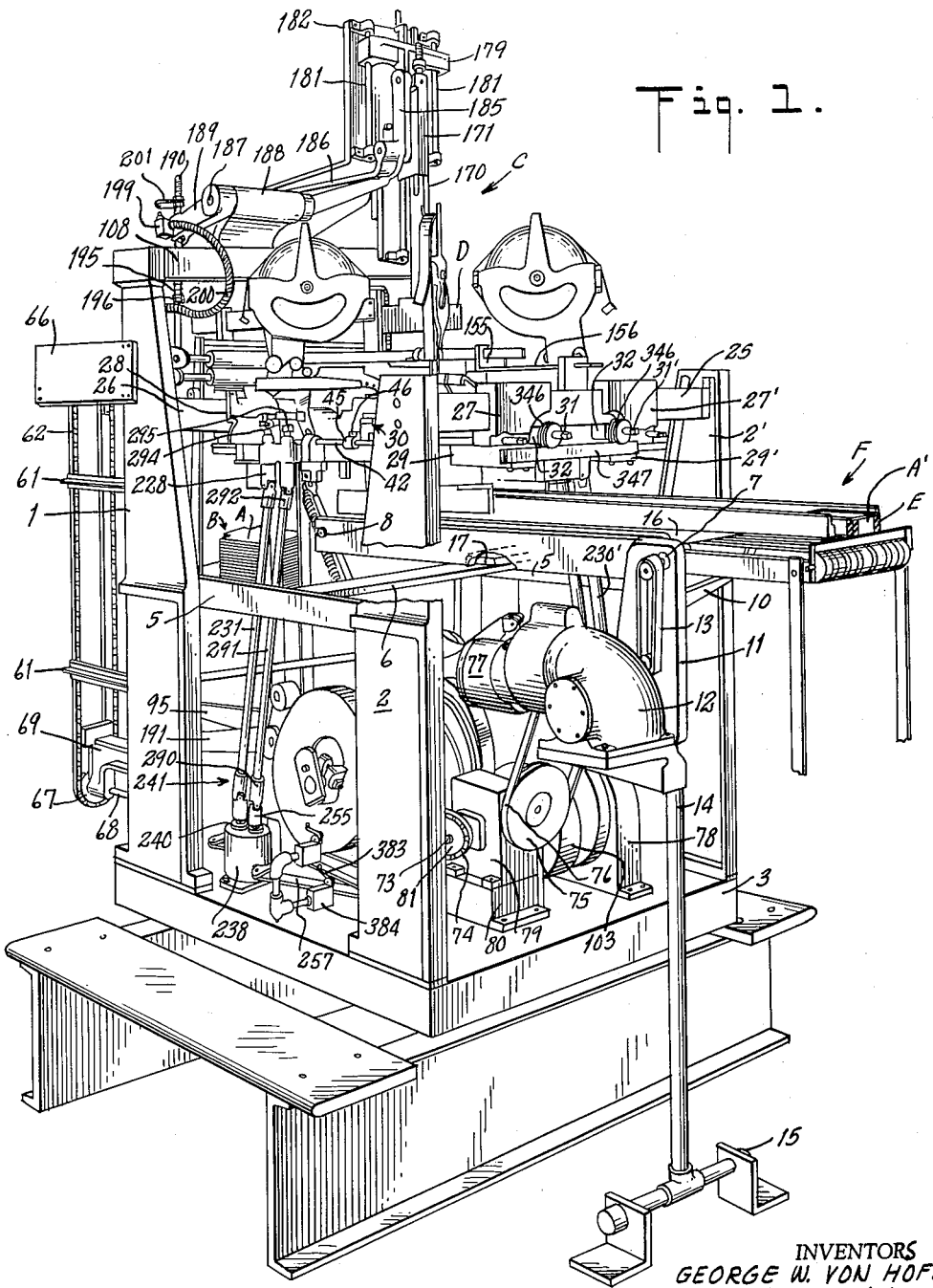
Figure 2:
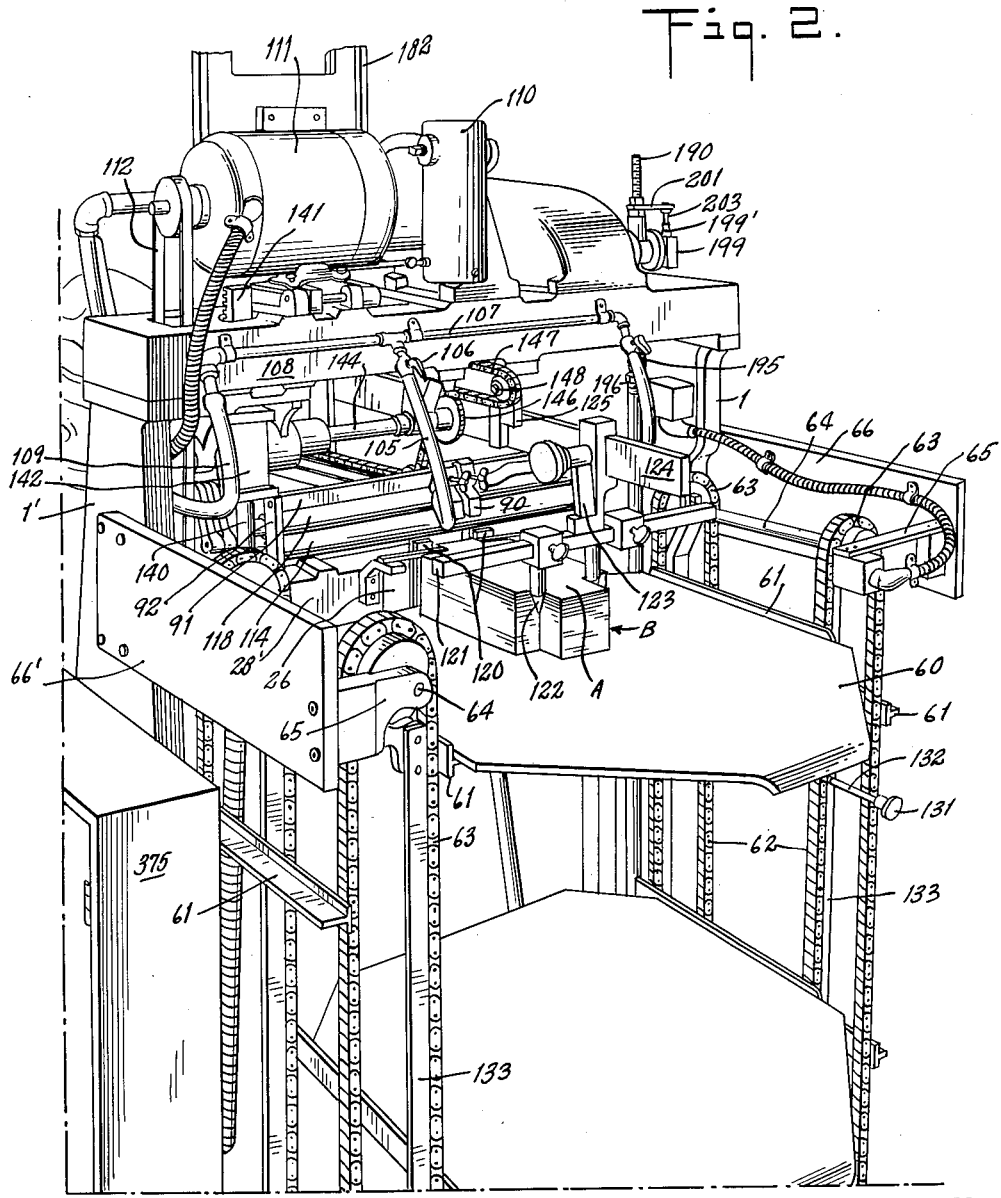
FIG. 2 is a perspective view of the upper rear portion of the machine shown in FIG. 1.

The machine illustrated in the drawings manufactures rectangularly-shaped boxes or trays from blanks A which are cornered and scored and which are fed successively from a pile or stack B of such blanks to a station C (compare FIGS. 1 and 2). As each blank A arrives at station C it is bent into box or tray form by the coaction of a block or form D and folding devices which bend the flanges of the blank up against the sides of the form D as the latter descends in its advancing stroke. The blank A being properly bent on the form D, stay strips E are then simultaneously applied to the four corners of the formed blank to secure together the abutting ends of the blank flanges forming such corners. The completed box A′ is then stripped from form D and deposited on the belt of a conveyor unit F which transports the box out of the machine.

It will be noted from FIGS. 1 and 2 of the drawings, that the frame of the machine comprises a pair of spaced rear standards 1, 1′ and a pair of spaced front standards 2, 2′. The four standards stand upon and are secured by bolts to the corners of a rectangularly-shaped base or foundation 3.

The tops of the pair of front standards 2, 2′ are approximately at the level of the folding and staying devices at station C in the machine and are connected by a fixed bar 25 bolted to such standards. A similar transverse bar 26 is fixedly secured to the rear standards 1, 1′ at the same level as bar 25. These two fixed bars 25, 26 support the mechanism which bridge the space over the cross bar 6 and the conveyor unit F. As shown in FIGS. 1 and 2 of the drawings, the fixed bar 25 has slidably mounted thereon a pair of slides 27, 27′ and the fixed bar 26 has slidably mounted thereon a pair of slides 28, 28′. The slides 27, 28 are connected to the ends of a movable bar 29 to support the latter in depending relation on the fixed bars 25, 26. In a similar manner slides 27′, 28′ support the parallelly arranged movable bar 28′ on the fixed bars 25, 26. Secured to and located approximately centrally on the bars 29, 29′ in predetermined accurate position with respect to the forming block D, are brackets 30, 30′, through which extend rods 31, 31′ respectively. The rods 31, 31′ are both slidable and rotatable with respect to their associated brackets. The ends of rods 31, 31′ are rotatably supported in bearings 32 provided on the members connecting the ends of the movable bars to the slides, and adjacent to such bearings, are formed in the shape of pinions 33. Secured to the fixed bars 25 and 26 are racks 34 which engage the pinions 33 on rods 31, 31' (note also FIG. 5). The front ends of rods 31, 31' extend forwardly of the slides 27, 27' and are nut-shaped so that a wrench or suitable hand crank may be utilized to rotate the same. It will be understood that when rods 31, 31' are rotated, they will travel along the four racks 34 on bars 25, 26 to cause the slides 27, 27', 28, 28' and consequently the movable bars 29, 29' to be slidably moved on the fixed bars 25, 26. The movable bars 29, 29' can thus be adjusted parallely relative to each other to a position determined by the width of the box or tray to be made by the machine. When the bars 29, 29' are properly positioned, they are fixed with relation to the fixed bars 25, 26 by manually operable set screws 35 provided on the slides and engageable with the fixed bars 25, 26 when tightened.

Mounted on the movable bars 29, 29' and capable of movement longitudinally along the same, are four corner blocks on which are mounted the stay feed and stay applying mechanisms of the machine. It will be noted from FIG. 11 of the drawings, that corner blocks 40, 40' are slidably mounted in spaced relation on movable bar 29 so that bracket 30 is located therebetween and that blocks 41, 41' are slidably mounted in spaced relation on movable bar 29' so that bracket 30' is located therebetween. The blocks are formed so that the rods 31, 31' extend therethrough, the blocks being thus slidable relative to such rods as well as the movable bars. The blocks are adjusted lengthwise of the movable bars 29, 29' by a pair of threaded rods or screws 42, 42'. Rod 42 includes a right-hand threaded section 43 which extends through and is in threaded engagement with block 40 and a left-hand threaded section 44 which extends through and is in threaded engagement with block 40'. The two sections are coupled together by a pin coupling 45 located between the lugs or projections 46 of bracket 30 which coact with such coupling to fix the position of rod 42 relative to bar 29 but permits rotational movement of such rod relative to bar 29. The ends of rod 42 are rotatably supported by bearings provided on the members connecting the ends of bar 29 with slides 27, 28 and the forward projecting end of rod 42 is nut-shaped so that it may be turned by a wrench or hand crank. It will thus be understood that as rod 42 is rotated it will cause blocks 40, 40' to slidably move toward or away from each other on rod 31 and bar 29 to positions controlled by the length of the box or tray to be manufactured. In the sliding movements thereof, the two blocks 40, 40', are maintained accurately centered with respect to the forming block D by the coupling 45 and the lugs 46 on bracket 30. In a similar fashion rod 42' is composed of a right-hand thread section 43' which extends through and is in threaded engagement with block 41 and a left-hand threaded section 44' which extends through and is in threaded engagement with block 41'. The two sections 43', 44' are connected together by a coupling 45' centered relative to the forming block D by lugs 46' provided on bracket 30'. Rod 42' is operated in a manner similar to that explained with respect to rod 42 to obtain proper adjustment of the corner blocks 41, 41' relative to the box or tray to be manufactured and to locate such blocks in accurate position relative to the forming block D. It will be noted also that by reason of the above described construction, the adjustments of rods 31, 31' which control the spacing between corner blocks 40, 41 and corner blocks 40', 41' and the said adjustment of rods 42, 42' which control the spacing between corner blocks 40, 40' and 41, 41' may all be made from a central location at the front of the machine. Thus adjustments for any desired arrangement of the corner blocks supporting the stay feed and applying mechanism may be made readily at this easily accessible position.

Associated with the corner blocks 40, 40', 41 and 41', are guide and supporting bars for holding a blank A in proper position to be bent into box form when the forming block D descends between such bars. As is shown in FIG. 11, such guide and supporting bars include a pair of angle bars or rails 50, 50', each of which is adjustably supported at its front end on an associated corner block and at its rear end on a slide on bar 26. Rail 50 is supported by block 40' and slide 28, while rail 50' is supported by block 41' and slide 28'. The rails are connected to the blocks 40' and 41' by vertical bars 212' and 213' respectively, the latter of which have adjustably secured thereto bracket members 52 formed at their ends to slidably hold the rails. The rails are adjustably connected at their rear ends to blocks 51, 51' mounted on slides 28, 28', respectively. Each rail has a horizontal edge on which the outer edge of a flange of the blank rests and a vertical edge which guides the blank in its advancing movement on the rails. It will be noted in FIG. 11 that the holding ends of bracket members 52 also function as stops to engage the leading ends of the side flanges of the blank and thereby properly register the blank with respect to the form D. As will hereinafter become more clear, bracket members 52, in effecting a proper registration of the blank for the forming operation, cooperate with a stop lug 155 which engages with the leading edge of the forward end flange of the blank after it has been deposited on the rails 50, 50', and a pusher 53 (FIG. 8) which engages with the rear edge of the rear end flange of the blank and pushes the blank into registration with the bracket members or stops 52 and the end stop 155.

Figure 3:
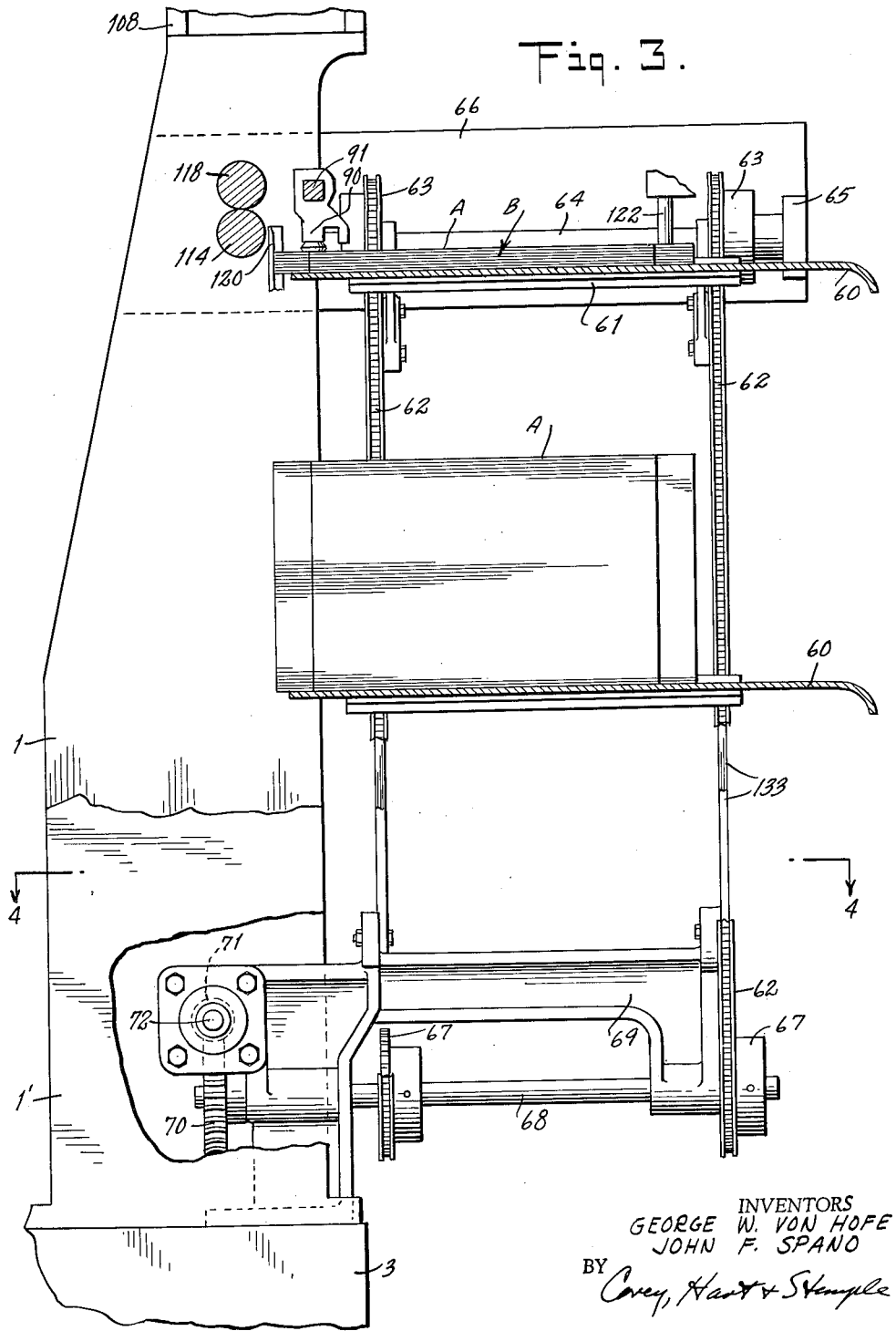
FIG. 3 is a vertical sectional view of the mechanism for feeding the box blanks to the machine.
Figure 4:
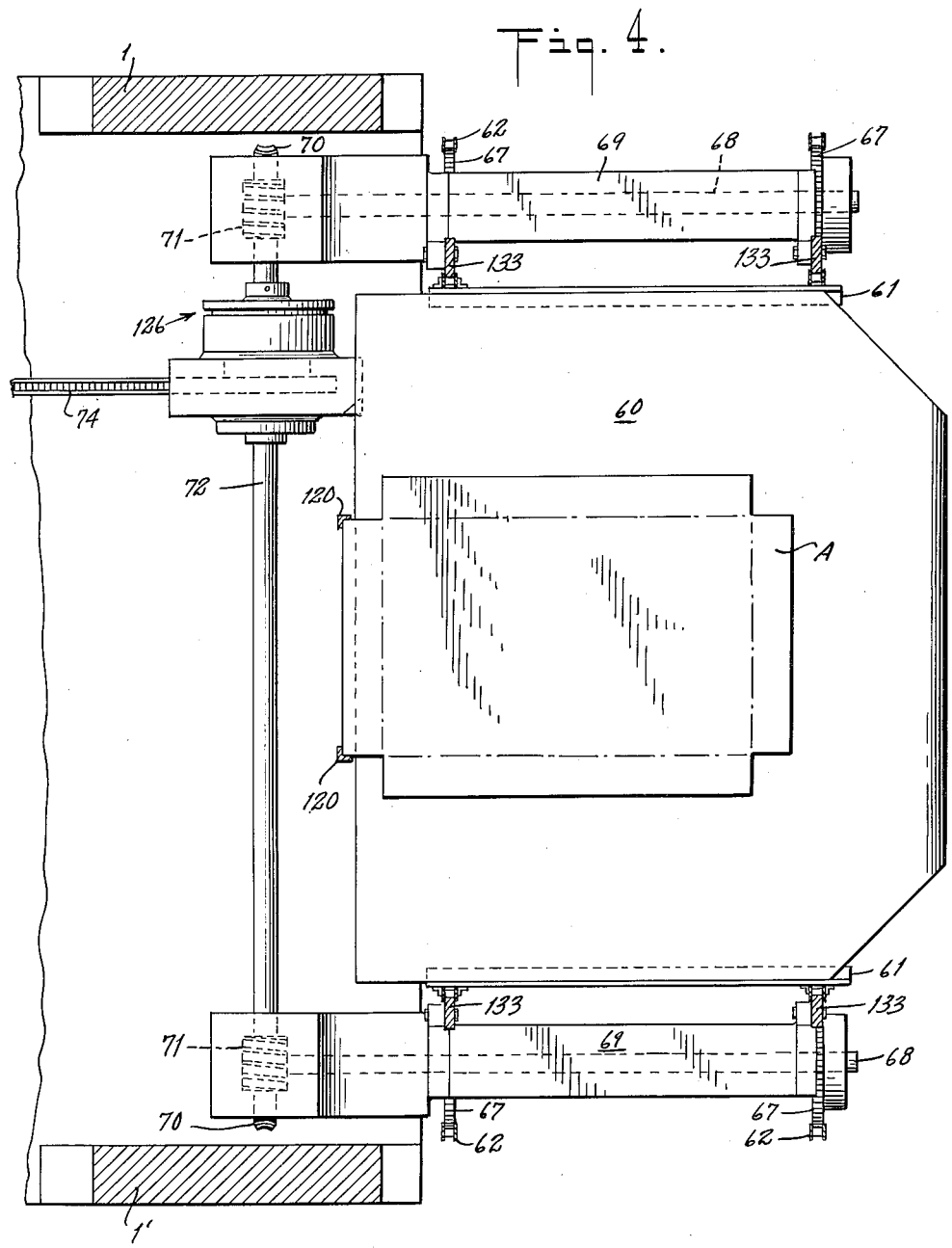
FIG. 4 is a sectional view taken along the line 4—4 of FIG. 3.

The blank A is fed to the guide rails 50 from the stack or pile B by mechanism now to be described. As shown in FIGS. 2, 3 and 4, the pile B of blanks is carried by a plate 60 whose sides are detachably supported by a pair of angle bars 61 each secured to a pair of vertically disposed chains 62. The chains are supported at the upper ends thereof by sprockets 63 which are secured to shafts 64 rotatably mounted on bearing brackets 65. The bearing brackets are provided on a pair of frame extensions 66, 66' supported by the standards 1, 1'. At their lower ends the chains pass over sprockets 67 mounted on shafts 68 which are rotatably supported by bearing brackets 69 mounted on the base 3 adjacent to the feet of the standards 1, 1'. The shafts 68 are provided at their inner ends with gears 70 that mesh with a pair of driving worm gears 71 provided on the ends of a transverse shaft 72 located at the rear of the machine. The shaft 72 is driven by a reducer shaft 73 located at the front of the machine (note FIG. 1), through an electric clutch 126 (FIG. 4) which controls the connection of shaft 72 which one end of a chain 74 that is supported at its forward end by a sprocket 81 secured to shaft 73. The reducer shaft 73 is connected by the gearing of reducer 79 to a wheel 75 which is connected by a belt 76 to the drive shaft of a motor 77 located above such wheel. The motor is secured to a bracket provided on a standard 78 which is mounted on the base 3 between the front standards 2, 2' (note FIG. 1). The reducer 79 of which shaft 73 forms a part is mounted on a block 80 secured to base 3.

The blanks A are removed from the top of the stack on plate 60 by a suction mouthpiece 90 which is adjustably mounted on a transverse rod 91 supported on the upper ends of a pair of vertically disposed spaced rods 92 located between the frame extensions 66, 66' (note FIGS. 2 and 5). The rods 92, adjacent to the upper ends thereof, are pivotally supported at 93 on a pair of rearwardly extending arms 94 secured to the feed roll bearing brackets 115 mounted on the standards 1, 1' (note also FIGS. 6 and 7). The lower ends of rods 92 are connected to the ends of lever arms 95, 95' secured to a transverse shaft 96 rotatably suported by frame members mounted on the base 3 of the machine. Lever arms 95, 95' are oscillated through shaft 96 by a forwardly extending lever arm 97 integral with lever arm 95' and carrying at its outer end a cam roller 98 which rides on the outer cam surface of a cam 99 mounted on cam shaft 100. Mounted on shaft 100 is a gear 101 driven by a gear 102 secured to a shaft 73' aligned with and connected to reducer shaft 73 through a clutch 103. Shaft 73' is rotatably supported by bearings provided on the standard 78. As a result of this construction the arms 92 are periodically oscillated about pivots 93 during the operation of the machine to move the transverse rod 91 and mouthpiece 90 towards and away from the top of the stack B.

Suction is supplied to the mouthpiece 90 through a tube 105 connected to an adustable valve 106 which is provided on a pipe 107 that is secured to a transverse beam 108 mounted on the upper ends of the rear frame members 1, 1' (note FIG. 2). The pipe 107 is connected by a tube and pipe assembly 109 to a suction unit 110 mounted on the beam 108. The suction unit 110 is directly coupled to the shaft of a motor 111 mounted on beam 108 adjacent to such unit. Motor 111 is also drivingly connected by a belt 112 to a pulley 113 secured to one end of a roll 114 rotatably supported by the fixed feed roll bearing brackets 115 (note FIG. 6). Roll 114 is connected by gears 116, 117 to a feed roll 118 rotatably supported by bearing brackets 115' pivotally carried by the brackets 115 and preferably spring biased to normally urge feed roll 118 towards a predetermined adjusted position with relation to feed roll 114. The arrangement is such that motor 111 constantly rotates rolls 114 and 118 in opposite directions so that a blank fed thereto by the mouthpiece 90 will pass rapidly between such rolls toward the front of the machine. A blank is fed to the rolls 114, 118 on the upward stroke of mouthpiece 90, the suction in the latter having an insufficient hold on the blank to prevent the rolls seizing the blank and feeding it forwardly when positioned therebetween. Almost simultaneously, means come into operation to open the vacuum line to the atmosphere. This means includes a valve member 134 controlled by the lever arm 95' and connected in the suction line represented by the pipe assembly 109 (note FIG. 13). Suction is created in mouthpiece 90 when it comes into engagement with the top of the stack. As the lever arm 95' reaches the end of its upward stroke it actuates the valve member 134 to connect the suction line with the atmosphere.

The blanks A are maintained in proper position in the stack B so that they will be fed properly by the mouthpiece 90 through the rolls 114, 118 to the operating mechanism of the machine by a pair of vertical guide rods 120 which are carried by the two slides 28, 28'. Thus as the slides are actuated to change the movable bars 29, 29' for a different width of box or tray, the guides 120, 120 are automatically adjusted simultaneously to coact with the different sized blank to be used in making the new box or tray. As shown in FIG. 2, the guides engage the corners of the end flange of the blank adjacent to the rolls 114, 118 to properly hold the stack of blanks relative to the suction mouthpiece 90. The notches formed by the end flange and the ends of the two side flanges of the blank on the other end of the stack of blanks are engaged by a pair of guides 122 adjustably mounted on a transverse rod 121. The rod 121 is supported in depending relation by a slide 123 adjustably mounted on a bar 124 extending lengthwise of the machine. The bar 124 is adjustably supported by a bracket 125 secured to the transverse beam 108. When in adjusted position, the bar is secured to the bracket 125 by a hand operated clamping knob 125' provided on such bracket.

As the stack on the plate 60 is depleted by the mouthpiece 90 during the operation of the machine, the chains 62 are actuated to raise the plate in a step-by-step fashion. As shown in FIG. 4 of the drawings, the shaft 72 driving such chains is provided with an electric clutch 126 which controls the connection of such shaft with the driving belt 74. The clutch 126 is controlled by the mouthpiece 90 through a vacuum controlled built-in micro-switch 127 which is electrically connected to the clutch 126 and is included in the suction line represented by the pipe assembly 109 (note FIG. 13). The construction of the clutch 126 and switch 127 is such that when there is vacuum in the line, switch 127 is open and clutch 126 is disengaged. On the other hand, when there is no vacuum in the line, clutch 126 is in a condition to connect shaft 72 to the driving chain 74. The clutch 126 is also controlled by a micro-switch 128 (note FIGS. 5 and 8) that is actuated by an arm 129 mounted on a rod 92. In the reciprocal movement of rod 92, if the stack is low, the arm 129 will always engage and close switch 128 to close the circuit for clutch 126, because switch 127 is closed as a result of no suction in the line. On the other hand, if the top of the stack is within a predetermined range, the arm 129 will be prevented from closing switch 128 thus maintaining the circuit for clutch 126 open even though there is suction in the line and switch 127 is closed. The clutch 126 is further controlled by an arm 130 provided on rod 92 and engaged by the plate 60 when the latter is raised above a predetermined level. When this occurs, plate 60, through arm 130, will prevent the rod 92 from completing its downward stroke and thereby render the arm 129 unable to actuate switch 128. The switch 128 may be manually closed by actuating a knob 131 provided on a rod 132 movably supported on the chain guide bar 133 and operatively associated at its inner end with the switch 128.

The blank A fed forwardly by the rolls 114, 118 is ejected thereby onto the guide rails 50, 50'. During such movement of the blank, positioning mechanism comes into operation to insure accurate registration of the blank relative to the forming block C. As shown in FIGS. 2 and 6 to 10 of the drawings, such positioning mechanism comprises a vertical rod 140 which is connected at its lower end to an arm of a cam lever 135 pivotally mounted on the lower end of the standard 1'. The other arm of lever 135 carries a cam roller 136 which rides on cam 137 secured to shaft 100. The rod 140 is provided at its upper end with a rack 141 that vertically reciprocates in a guide 142 pivotally connected to the underside of the crossbeam 108 to pivot about the longitudinal axis of shaft 144. The rack engages with a pinion 143 mounted on one end of the shaft 144 which is rotatably supported in depending relation by bearing brackets 145 secured to crossbeam 108. Mounted on the other end of shaft 144 is a sprocket 146 which engages with the lower run of a chain 147. Shaft 144 and sprocket 146 are connected to the drive pinion 143 through a clamping screw 138 which may be loosened to permit free rotational movement of sprocket 146 and the adjustment of the chain 147 with which such sprocket is engaged. Chain 147 is supported on the longitudinally extending vertically disposed plate or bar 124 by a pair of sprockets 148, 149 rotatably mounted on such plate at a fixed predetermined distance from each other. The upper run of chain 147 spans the distance between sprockets 148, 149 and is therefor of fixed length. Bar 124 has connected thereto a depending vertically disposed section 150 on the lower end of which is rotatably mounted a sprocket 151 between which and the sprocket 149 extends a vertical leg of the chain 147. The lower run of the chain is composed of three portions, one portion of which extends from under sprocket 151 substantially horizontally to and under a sprocket 152 rotatably mounted on a stub shaft fixed to the frame of the machine. The second portion of such lower run extends upwardly and rearwardly from sprocket 152 to ride over the fixed sprocket 146, and the third portion thereof extends substantially horizontally from sprocket 146 to sprocket 148. Bar 124 and its depending portion 150 are adjustably carried by bracket 125 secured to beam 108 so that they may be shifted longitudinally to correctly position the lower run of the chain relative to the box or tray being made. Inasmuch as sprockets 148, 149 and 151 are movable with bar 124 and its portion 150 in adjustments of the latter, they are movable relative to fixed sprockets 152 and 146. In any adjustment of the movable sprockets therefore, the lengths of the lower horizontal run portions will vary proportionally so that the length of the lower run of the chain from sprocket 151 to sprocket 146, can be varied to adjust for a relatively wide range in lengths of boxes or trays without requiring any change in the tension of the chain itself. In the operation of the machine, as sprocket 146 is rotated alternately in one direction and then the other, as the rack 141 is reciprocated vertically, the section of chain between sprockets 146 and 151 will advance and retract alternately. Secured to such chain section is a lug 154, which during each reciprocation of the chain in each cycle of the machine, will advance to a position beneath sprocket 151 and then retract to a position adjacent to sprocket 146. As the lug travels from sprocket 152 to sprocket 146 in its retracting movement, it will be lifted or moved up out of the path of feed of a blank ejected by the rolls 114, 118 to a position above the roll 118. This upward movement of the lug is accomplished while the mouthpiece 90 is feeding a blank to the rollers 114, 118. The arrangement and timing of the mechanisms is such that when a blank A is advanced by rollers 114, 118 onto the guides 50, the lug 154 will be dwelling in its predetermined uppermost position and will be at rest so that the portion of the chain between sprockets 151, 152 will act as a top guide for the blank in its advancing movement. Upon this advance of the blank A, the chain 147 is then advanced to move the lug 154 downwardly into engagement with the rear edge of the blank between the guides 50 and to thus positively continue the advancement of the blank until the leading edges of the latter comes into engagement with the stop lug 155 and the holding ends of the bracket members 52, as has previously been explained. The stop lug 155 is provided on the inner end of an arm 156 adjustably secured to the fixed bar 25. In order that the described feeding operation by lug 154 may be accomplished, the parts are so designed that lug 154 travels downwardly into the path of feed of the blank in a following position as the blank is advanced under the compulsion of the rolls 114, 118. The lug 154 will pause in its advanced position, coacting with stop lug 155 and bracket members 52 to hold the blank A on guides 50 in proper registration relative to the forming block D until the latter strikes the blank to form it into a box.

Mounted on a bracket 275 is a diaphragm (note FIG. 13) controlling a finger 276 which is moved into the path of a lever arm 268 to block movement of such arm and thereby prevent the feed of stay strips to the staying mechanism when the feeding mouthpiece fails to feed a blank A to the forming mechanism. As shown in FIG. 13, the diaphragm is connected by a tube 277, 277' to the nozzle 278 on pump 110 so that it is displaced by a condition of suction whenever the mouthpiece 90 grips a blank A to feed it to the rolls 116, 118. When however the mouthpiece 90 fails to feed a blank, the finger 276 will remain in blocking position so that lever arm 268 shall be unable to operate in the normal fashion. In other words, when there is vacuum in the system due to the fact that the mouthpiece 90 is engaging a blank, the diaphragm will position finger 276 so as to enable the paper to be fed. On the other hand, when there is no vacuum in the system due to the fact that the mouthpiece 90, in its movement towards the rolls 114, 118, is not feeding a blank, the diaphragm will prevent the feed of the stay strips.

As has been previously explained, advanced portions of the stay strips E are cut off and secured to the corners of a box during the advancing movements of the pressers. When the stay strips have so been applied to a box, thus completing the formation of the latter, the forming block D is retracted. As the block D is retracted, stripping fingers come into operation to strip the box off the same, the box being then held in suspended fashion by the stripping fingers. While the box is so held in suspension, crimping blades move in to crimp or bend the fold lines of the flanges or walls of the box to an angle greater than 90° so that when such blades are retracted, any tendency of the flanges or walls of the box to spring outwardly will have been eliminated. There are two pairs of crimping blades or bars provided to accomplish this crimping of the side walls of the box, one pair for each side wall. There are also two pairs of crimping blades or bars 344, 345 (note FIGS. 5 and 8) for bending the end flanges or walls of the box. One blade in each pair of such blades is located vertically above the other blade so that during the advancement of a pair of crimping blades toward a box held by the holding fingers, the upper blade will come into engagement with a wall of the box, while the other lower blade will advance to a position under the bottom of the box. The lower crimper blades are thus positioned to fix the position of the bottom of the box and to prevent any downward movement of the same while the walls of the box are bent in by the upper blades. Each pair of blades is provided on the lower end of a vertically disposed bracket (note the brackets 343 shown in FIGS. 5 and 8 for the end crimpers 344, 345). The bracket 343 located in front of the box (see FIG. 5) is adjustably mounted on an angle support 349 provided on a slide 348. The slide 348 is slidably mounted in a bracket 350 depending from the front fixed cross bar 25. The slide 350 carries a front transverse bar 347 which is engaged by collars 346 provided on the front ends of the longitudinal bars 31, 31' (note also FIG. 1). Secured to the rear ends of the bars 31, 31' are collars 328 which engage a transverse bar 329 mounted on a slide 330 (note FIGS. 5 and 8). The slide 330 moves in a bracket 331 located between the slides 28, 28' and suspended from fixed bar 26. The slide 330 is connected to one arm of a rock lever 332 pivotally mounted on a shaft supported by bracket 333. The other arm of rock lever 332 is connected to the upper end of a rod 334 which is connected at its lower end to a cam lever 335 mounted on shaft 96. A cam roll 336 is provided on the outer end of cam lever 335 and engages a cam 337 provided on shaft 100 (note FIG. 5). A spring 338 maintains the cam roll 336 in engagement with the cam surface of cam 337. It will be understood from the foregoing, that as the cam 337 rotates, arm 334 will be actuated through cam roller 336 and arm 335, to actuate lever 332, which in turn reciprocates slide 330 lengthwise of the machine. The reciprocal movement of slide 330 is imparted to rods 31, 31' through bar 329 and collars 328. As the bars 31, 31' are reciprocated, the collars 346 on the front ends thereof, reciprocate slide 348 through the collars 346 and transverse bar 347. As slide 348 is reciprocated it will reciprocate the front end crimper blades or members 344, 345 toward and away from the box to crimp the fold line of the front wall of the box.

The bracket 343 supporting the pair of crimper blades 344, 345 for crimping the fold line of the rear wall of the box, is adjustably mounted on an angle support 351 provided on a slide 352 (note FIGS. 5 and 8). The slide 352 is located in spaced relation above the slide 330 and is also slidably supported by the brackets 331 depending from the rear fixed cross bar 26. Slide 352 is drivingly connected to slide 330 by racks 353 secured to opposed surfaces of such slides and engaged by a pinion gear 354 located therebetween and mounted for rotational movement about a fixed axis on a shaft supported by bracket 331. Thus as slide 330 is reciprocated by the lever 332 in the manner explained, it will reciprocate slide 352 through the racks 353 and gear 354. Because of the rack and pinion connection between the two slides, slide 352 will advance the crimping blades 344, 345 carried thereby toward the rear wall of the box A', while slide 330, moving in the opposite direction, will be moving the rear transverse rods 329 and consequently the front transverse rod 347 in a direction which causes the set of front crimper blades to move toward the front of the box. As shown more clearly in FIG. 8 of the drawings, the slide 330 is also provided with a bracket 355 which carries the pusher 53. As previously explained, the pusher 53 is for registration of the blank against the stops 52, 155 and under the forming block D. The pusher 53 is adjustable in a slot on the bracket 355 to accommodate any blank size. It is to be noted that pusher 53 together with stops 52, 155 provides the required accurate registration of the blank with relation to the forming block D, and that the lug 154 on chain 147 merely insures that the blank A will be transported to a position beyond the leading edge of the pusher 53, which travels with a sliding, reciprocal motion within a distance range of approximately ½ to ⅝ of an inch. The bracket stop 52 may be provided with a spring finger or clip 54 which engages the advancing end of the blank to cushion its engagement with stop 52 and to yieldably hold the blank properly in position until engaged by the forming block D (note FIG. 12).

Following the crimping operations above described, the box is ejected from the machine to the conveyor unit F by four box separating fingers pivotally mounted intermediate their ends on connecting links pivotally secured to the plates supporting the end flange folding members.

While we have hereinabove described and illustrated in the drawings one form in which the invention may be practiced, it will be apparent that various modifications may be made in the construction and arrangement of the parts thereof within the scope of the invention. For example, instead of using a pair of levers of the construction of lever arms 94 (note FIG. 5) for connecting the upper end portions of the rods 92 which support the transverse rod 91 on which the suction mouthpiece 90 is mounted, to the feed roll bearing brackets 115, there may be used in place of each arm 94, a compound lever constructed to cause the mouthpiece 90 to be raised vertically after the advancing end of a blank A carried by such mouthpiece has been inserted between the feed rolls 114, 118. By thus removing the rubber vacuum cups which constitute the mouthpiece 90, to a position in which they will not become engaged by the blank A as the latter is drawn through the feed rolls 114, 118, substantial wear thereof is avoided. A compound lever capable of accomplishing these results is shown in FIGS. 14 to 17 of the drawings, in which those parts which are similar to the parts hereinabove described, have been given similar reference numerals. It will be understood that in the machine each of the rods 92 will be supported at its upper end by the compound lever construction illustrated in FIGS. 14 to 17 and that each of such levers includes a lever arm 390 pivotally connected at its lower end to an associated feed roll bearing bracket 115 by a pin 391. The lever arm 390 is substantially vertically disposed and is pivotally connected at its upper end by a pin 392 to one end of a lever 393 which is loosely connected intermediate its ends to its associated rod 92 by a pin 394. The pin 394 carries a roll 395 which seats on a curved shoulder 396 formed in the upper end of lever 390 adjacent to pin 392. Roll 395 is normally maintained in engagement with shoulder 396 by a spring 397 which is connected at its upper end to a stud 398 provided on the other end of lever 393 and which is connected at its lower end to a stud 399 mounted on lever arm 390 adjacently below pin 391. It will be noted that the axes of pin 392, pin 394 and stud 398 are all contained in one plane and that the actual lever arm of compound levers 390, 393 is the distance between the axis of pin 391 and a second plane passed vertically through said one plane at the axis of pin 394. This actual lever arm which is relatively short in length, affords substantially the same leverage as the lever arms 94 in the above described embodiment. On the other hand, the levers 95, 95' which are loosely connected to the lower ends of the rods 92, are of relatively long length. As a result of the short leverage of the compound levers, the long length of rods 92 and the long length of levers 95, 95', a relatively small angular motion of rods 92, as arms 95, 95' are raised, causes a relatively large angular motion of the compound levers. The angular motion of the compound levers is such that the blank supporting portions of the vacuum cups carried on the transverse rod 91 supported on the upper ends of rods 92, are caused to follow a substantially arcuate path from the top of the stack of blanks to the proximity of the bight of the feed rolls 114, 118. The direction of the arcuate path is indicated in FIG. 15 of the drawings by a series of arrows which show the path of movement of the axis of pin 394 during such lifting action of the rods 92. FIG. 15 of the drawings shows the relation of the parts at the end of such arcuate movement which is just prior to the completion of the upward stroke of rods 92. Compare this with FIG. 16 which shows the relation of the parts in the retracted position of rod 92. The aforesaid arcuate movement of the vacuum cups, it is understood, will take place also in the operation of the construction that has been previously described. In the instant construction, however, means are provided to break the normal arrangement in which the compound levers are held by the spring 397 after the vacuum cups have inserted the advancing end of a blank between the feed rolls 114, 118. This means comprises an abutment 400 provided on lever 390 so that it is in the path of movement of its associated rod 92. The abutment 400 has an elongated vertical surface 401 which is disposed in opposed relation to the direction of angular movement of its associated rod 92 when the latter is raised by its associated long lever 95, or 95' and which is located adjacently beyond the axis of pin 391. When an advancing rod 92 comes into engagement with its associated surface 401 any further lifting action by its associated long lever 95 or 95' will result in a movement of the compound lever around the axis of the pivot pin 391. In other words, the angular motion of the associated long lever will be transformed into a sliding motion of rod 92 on surface 401 so that the vacuum cups 90 will be lifted against the tension of spring 397 up and out of the range of the path of travel of a blank passing through the feed rolls 114, 118 (note the dotted line position of cups 90 in FIG. 15 of the drawings and the additional vertical motion at the end of the arcuate path indicated by the arrows in such figure). Surface 401 is provided with a very smooth finish so that its associated rod 92 can readily slide thereover. When the levers 95, 95' are again lowered, the spring 397 will again return the rolls 395 to seating position on the shoulders 396 and the compound levers will again function as unitary levers.

It will be understood by those skilled in the art that other modifications and changes may be made in the construction hereinabove described and illustrated in the drawings without departing from the spirit of the invention. Hence, I do not wish to be limited to the particular form illustrated and described, or to the details of construction thereof, but intend to cover all constructions coming within the scope of the invention as expressed in the following claims.

We claim:

1. In a box staying machine, in combination, means for setting up box blanks into box form, means for supporting a supply of box blanks, means for feeding box blanks from said supporting means into proper registration with relation to said setting up means, said feeding means including an endless chain extending lengthwise of the path of feed of the blanks in their travel from said supporting means to said setting up means, a lug member secured to said chain, and means for reciprocating said chain, said chain being constructed to advance said lug from an elevated position down into the path of feed of a blank and into engagement with the following end of a blank, and to retract said lug to said elevated position out of the path of feed of a succeeding blank.

2. In a box staying machine, in combination, means for setting up box blanks into box form, means for supporting a supply of box blanks, means for feeding box blanks from said supporting means into proper registration with relation to said setting up means, said feeding means including a pair of spaced rails associated with said setting up means and defining a portion of the path of feed of said blanks, a pair of feed rolls for ejecting a blank fed thereto upon said rails, an endless chain substantially parallel as a whole with said rails and located therebetween, a lug member secured to said chain, and means for reciprocating said chain, said chain being so constructed and arranged that during its advancing movements it moves said lug from a position offset from the path of feed of a blank ejected by said feed rolls into such path of feed to engage with the rear end of the blank, and during its retracting movements it withdraws such lug to said offset position out of the path of feed of a succeeding blank.

3. In a box staying machine, in combination, means for setting up box blanks into box form, means for supporting a supply of box blanks, means for feeding box blanks from said supporting means into registration with said setting up means, said last mentioned means including a reciprocable chain extending as a whole substantially parallel with and over the path of feed of a blank in the region of such chain and having a lug member depending from such chain to enable it to engage a body blank when in the plane of feed of such blank, and means to withdraw said lug from the path of feed of the blank to a position substantially above the same when the chain is moving in one direction and to advance said lug down into the path of feed of the blank when the chain is moving in the other direction.

4. In a box staying machine, in combination, means for setting up box blanks into box form, means for supporting a supply of box blanks, means for feeding box blanks from said supporting means into registration with said setting up means, said last mentioned means including a reciprocable chain extending as a whole substantially parallel with and over the path of feed of a blank in the region of such chain and having a lug member depending from such chain to enable it to engage a body blank when in the plane of feed of such blank, and means to withdraw said lug from the path of feed of the blank to a position substantially above the same when the chain is moving in one direction and to advance said lug down into the path of feed of the blank when the chain is moving in the other direction, said last mentioned means including a sprocket engageable with said chain and mounted for rotational movement about a fixed axis, means supporting said chain for movement relative to the axis of said sprocket, means for driving said sprocket to cause reciprocating movement of said chain, means releasably connecting said driving means to said sprocket to enable movement of said chain relative to said driving means.

5. In a box staying machine, in combination, means for setting up box blanks into box form, means for supporting a supply of box blanks, means for feeding box blanks from said supporting means into proper registration with said setting up means, said last mentioned means including a slidable bar extending as a whole in substantial parallelism to the path of feed a blank in the region of such bar, a plurality of sprockets mounted on said bar, a plurality of sprockets fixed with relation to said bar, a closed chain mounted on the sprockets of said bar and said fixed sprockets, said bar sprockets and said fixed sprockets being so arranged that no tensioning adjustment of the chain is required when the chain and said bar is shifted from one position to another relative to said setting up means, a lug secured to said chain, means for reciprocating said chain to reciprocate said lug through a predetermined distance, the arrangement of said sprockets being such that in its travel between said fixed sprockets the lug is advanced into and retracted from the path of feed of the body blanks.

6. In box making apparatus including means for supporting a plurality of box blanks, a feeding device for feeding said blanks to a station, means for feeding box blanks from said supporting means to said feeding device, including suction means for removing the blanks from said supporting means, an upright elongated member supporting said vacuum means on the upper end thereof, a relatively short lever mounted for pivotal movement about a fixed axis and pivotally connected adjacently to said upper end of said member, said member extending downwardly from such pivotal connection toward the base of the machine, a relatively long lever located below said blank supporting means and connected to the bottom end of said member, and means for oscillating said long lever to advance said elongated member and said short lever upwardly from lowered retracted positions, said levers and member being so constructed and arranged that a relatively small angular motion of said member causes a relatively large angular motion of said short lever to cause said suction means during the advancing upward movements of said member and short lever to follow a substantially arcuate path upwardly from its point of engagement with the blanks on said supporting means to the proximity of said feeding device.

7. The combination of means for supporting a stack of box blanks, blank feeding means spaced from the stack of blanks on said supporting means for feeding blanks to a station, means for successively transferring sheets from the top of the stack to said feeding means, including two substantially vertically disposed links, a cross bar supported on the upper ends of said links, suction means for removing sheets from the stack carried by said cross bar, a first pair of levers mounted for pivotal movement about a fixed axis located below the path of feed of the blanks to said feeding means and loosely connected to the upper ends of said links, said vertically disposed links extending downwardly along the stack of blanks on said supporting means toward the base of the machine, a second pair of levers located below said blank supporting means and mounted for pivotal movement about a fixed axis and loosely connected to the lower ends of said links, means for oscillating said second pair of levers to advance said links and said first pair of levers upwardly from lowered retracted positions, said first pair of levers being relatively short, and said second pair of levers being relatively long, the said links and levers being so constructed and arranged that a relatively small angular motion of said links cause a relatively large angular motion of said first pair of levers to cause the sheet engaging portion of said sheet transfer means during the advancing upward movements of said links and first pair of levers to follow a substantially arcuate path upwardly from the top of the stock to the proximity of said sheet feeding means.

8. In combination, means for supporting a supply of blanks, a blank feeding device spaced from the supply of blanks on said supporting means for feeding blanks to a station, means for successively transferring blanks from said supporting means to said feeding device, comprising a suction device having a blank engaging portion, means for causing said suction device to remove a blank from the supply thereof and to move it through a predetermined path of travel to said blank feeding device, and means operable at the end of the feeding movement of said suction device to advance the latter in a path different from said predetermined path of travel and such that the blank engaging portion of said suction device is removed from the path of travel of the blank delivered to said feeding device and traveling past said suction device as it is fed forwardly by said feeding device.

9. In combination, means for supporting a supply of blanks, a blank feeding device spaced from the supply of blanks on said supporting means for feeding blanks to a station, means for successively transferring blanks from said supporting means to said feeding device, comprising a suction device having a blank engaging portion, means including a compound lever and an upright elongated member for causing said suction device to remove a blank from the supply thereof and move it to said blank feeding device, said compound lever being pivotally connected at two vertically spaced points both located below the path of feed of the blanks from the supply thereof to said blank feeding device and constructed and arranged to normally cause said elongated member to move said suction device upwardly through a predetermined path toward said blank feeding device, and means including said compound lever to change the advancing movement of said elongated member to cause said suction device at the end of its feeding movement to advance in a path different from said predetermined path and such that the blank engaging portion of said suction device is removed from the path of travel of the blank delivered to said feeding device and traveling past said suction device as it is fed forwardly by said feeding device.

10. In combination, means for supporting a supply of blanks, a blank feeding device spaced from the supply of blanks on said supporting means for feeding blanks to a station, means for successively transferring blanks from said supporting means to said feeding device, comprising a suction device having a blank engaging portion, an elongated member supporting said suction device, a relatively short lever mounted for pivotal movement about an axis adjacent to said elongated member and loosely connected to the suction device supporting portion of said elongated member, actuating means connected to a portion of said elongated member spaced from the suction device supporting portion thereof and operable to advance said elongated member and said short lever from retracted positions, to cause said suction device to transfer a blank to said blank feeding device, said short lever being a compound lever and comprising a first lever member mounted for pivotal movement about said axis adjacent to said elongated member, a second lever member movably connected to said first lever member and to said elongated member, yieldable means connected to said lever members to cause them to function normally as a unitary lever, means on said first lever member engageable by said elongated member in the advancing movement of the latter to modify the normal relation of said first and second lever members and thereby to modify the advancing movement of said elongated member so that the blank engaging portion of said suction device is caused to move out of the path of travel of a blank delivered thereby to said feeding device and fed forwardly by the latter.

11. In combination, means for supporting a supply of blanks, a blank feeding device spaced from the supply of blanks on said supporting means for feeding blanks to a station, means for successively removing blanks from said supporting means and supplying them to said feeding device, comprising a substantially vertically disposed elongated member, a suction device supported on the upper end of said member, a relatively long lever mounted for pivotal movement about a fixed horizontal axis and loosely connected to the bottom end of said member, means for oscillating said bottom lever about its axis to raise and lower said member, a relatively short lever mounted for pivotal movement about a fixed horizonal axis and loosely connected to the upper end of said member, said short lever being a compound lever and comprising a first lever member pivotally connected to a stationary portion of the machine, a second lever member movably connected to said first lever member and to said elongated member, and a spring connected to said first and second lever members to hold them in engaged relation so that they function as a unitary lever, said compound lever, said bottom lever and said elongated member being so constructed and arranged that a relatively small angular motion of said elongated member causes a relatively large angular motion of said compound lever to cause the sheet engaging portion of said suction device during the advancing movements of said elongated member and compound lever, to follow a substantially arcuate path from the blanks on said supporting means to the proximity of said feeding device, said first lever member being provided with an abutment located in the path of advancing movement of said elongated member so that upon engagement of the latter with said abutment the angular motion of said elongated member is transformed into a longitudinal motion such that the engagement of said first and second lever members is broken and said suction device, at the end of its advancing arcuate movement toward said feeding device, is lifted out of the path of travel of a blank delivered to and fed forwardly by said feeding device.

12. In a staying machine, in combination, means at a set up station for setting up box blanks into box form, a hopper for stacking box blanks spaced from said station, means for feeding blanks from said hopper to said station including a pair of feeding rollers positioned adjacently to the front upper end of said hopper, means for successively transferring blanks from said hopper to said feeding rollers comprising a suction device having a blank engaging portion arranged to engage the top of the stack adjacently to the front of the hopper, means for causing said suction device to remove a blank from the stack and to feed it over the front upper end of said hopper to said feeding rollers, said feeding means including means movable from a position above the stack down into the path of feed of a blank and into engagement with the following end of a blank released by said feeding rollers and traveling toward said station under the motion given to it by said feeding rollers, without interruption of such forward movement of the blank, and said movable means then moving in unison with such blank to deliver it to said station.

13. In a staying machine, in combination, means at a set up station for setting up box blanks into box form, means for applying stays to the corners of a box set up by said setting up means, a hopper for stacking box blanks spaced from said station, and means for feeding blanks from said hopper to said station including means for successively removing blanks from the hopper by engagement with the topmost blank adjacent to the front of the hopper and feeding it over such hopper front, and means movable from a position above the stack down into the path of feed of a blank and into engagement with the following end of a moving blank fed over the top front end of said hopper and then moving in unison with such blank without interruption of the forward feed of the latter from the stack until such blank is delivered to said station.

14. In a staying machine, in combination, means at a set up station for setting up box blanks into box form, means for applying stays to the corners of a box set up by said setting up means, a hopper for stacking box blanks spaced from said station, and means for feeding blanks from said hopper to said station including means for successively removing blanks from the hopper by engagement with the topmost blank adjacent to the front of the hopper and feeding it over such hopper front, a blank engaging member, means carrying said member through a predetermined range of travel, and means operating said carrying means to cyclically move said member from a position above the stack down into the path of feed of blanks from said hopper and into engagement with the following ends of successive moving blanks fed over the top front end of said hopper and then to move said member in unison with an engaged blank without interrupting the forward feed of the latter, until such blank is delivered to such station.

15. In a staying machine, in combination, means at a set up station for setting up box blanks into box form, means for applying stays to the corners of a box set up by said setting up means, a hopper for stacking box blanks spaced from said station, and means for feeding blanks from said hopper to said station including means for successively removing blanks from the hopper by engagement with the topmost blank adjacent to the front of the hopper and feeding it over such hopper front, a pair of spaced rails associated with said setting up means and defining a portion of the path of feed of the blanks from said hopper to said station, means movable from a position above said rails down into the path of feed of a blank and into engagement with the following end of a blank moving along said rails to move in unison with such blank without interruption of the forward feed thereof so as to advance such blank along the rails to said station, and pusher means movable along the path of feed of a blank on said rails and into engagement with the following end of a blank moving on said rails to advance such blank along the rails toward said station, said movable means and pusher means coacting to assure advancement of a blank and the delivery thereof to said station.

16. In a box staying machine, means at a set up station for setting up box blanks into box form, means for applying stays to the corners of a box set up by said setting up means, means for supporting a plurality of box blanks, a blank feeding device spaced from said supporting means for feeding blanks toward said station, means for feeding blanks from said supporting means to said feeding device and means including an actuating member for operating said feeding means, said feeding and actuating means being constructed and arranged to cause during a single movement of said actuating member in the operative direction said feeding means to transfer a blank from said supporting means to said feeding device and to move out of travel of the path of the blank delivered to said feeding device and traveling past said suction device as it is fed forwardly by said feeding device.

17. In a box staying machine, in combination, means for folding box blanks and for staying the corners of said folded blanks, means for supporting a supply of box blanks comprising a plate on which the blanks are mounted in stack form, means including a suction device and an elongated actuating member therefor for removing blanks from such stack and feeding the same to said folding and staying means, and means for intermittently raising said plate as the blank supply is depleted including means supporting said plate and moveable to raise the latter, continuously rotating driven means, an electric clutch for connecting said driven means to said movable supporting means, a first switch electrically connected to said clutch and pneumatically connected to said suction device so as to be opened when vacuum is furnished to said suction device and to be closed to place said clutch in condition for operation when no vacuum is furnished to said suction device, a normally opened second switch connected to said clutch and mounted in fixed position in said machine, a switch operating member carried by said elongated actuating member and arranged to close said second switch in each cycle of movement of said actuating member to close the circuit for said clutch, said suction device preventing such operation of said switch operating member so long as the top of the stack is within a given range enabling said suction device to remove blanks therefrom.

18. In a box staying machine, in combination, means for folding box blanks and for staying the corners of said folded blanks, means for supporting a supply of box blanks comprising a plate on which the blanks are mounted in stack form, means including a suction mouthpiece an elongated actuating member therefor for removing blanks from such stack and feeding the same to said folding and staying means, and means controlled by said suction mouthpiece for intermittently raising said plate as the blank supply is depleted including means supporting said plate and movable to raise the latter, continuously rotating driven means, an electric clutch for connecting said driven means to said movable supporting means, and a vacuum controlled switch in fluid communication with said suction mouthpiece and electrically connected to said clutch, said electric clutch and switch being constructed and arranged that when there is suction in said switch, said switch is open and said clutch is disengaged, while when there is no suction in said switch, said switch is closed to close the circuit for said clutch and thereby place said clutch in condition to connect said driven means to said movable supporting means, a second normally opened switch connected to said clutch, a switch operating member carried by said elongated actuating member and arranged to close said second switch in each cycle of movement of said actuating member to close the circuit for said clutch, and a second member carried by said elongated actuating member and coacting with said plate to render said switch operating member inoperative to close said second switch when said plate is raised above a given level.

19. In a box staying machine, in combination, means for folding box blanks and for staying the corners of said folded blanks, means for supporting a supply of box blanks comprising a plate on which the blanks are mounted in stack form, means for removing blanks from such stack and feeding the same to said folding and staying means, and means for intermittently raising said plate as the blank supply is depleted including means supporting said plate and moveable to raise the latter, continuously rotating driven means, an electric clutch for connecting said driven means to said movable supporting means, a switch electrically connected to said clutch and controlling the operation of the same, a continuously reciprocating member, means connected to said reciprocating member for testing the top of the stack in each cycle of movement of said reciprocating member, a switch actuating member carried by said reciprocating member and operable when the stack is low to actuate said switch to close the circuit for said clutch and thereby place such clutch in condition to connect said driven means to said movable supporting means, and a second member carried by said reciprocating member and coacting with said plate to render said switch actuating member inoperative to actuate said switch to close the circuit for said clutch when said plate is raised above a given level.

20. In a box making machine, in combination, a frame, a station located in said frame for setting up box blanks into box form, means associated with said setting up station and operative on box blanks at said station, means on said frame for supporting a supply of box blanks at a place spaced from said station, means for feeding box blanks from a supply thereof on said supporting means along a path of feed into registration with said station, two movable parallel bars for supporting said operative means, a fixed bar mounted on said frame below said path of feed for supporting said movable bars, an operatively movable elongated member mounted in parallel relation to said fixed bar and in perpendicular relation to and extending below said path of feed, operable means engaging said elongated member and connecting rods connecting said operative means and said operable means, said operable means and said connecting rods being constructed and arranged to maintain an operative connection between said operative means and said elongated member in any adjusted position of said movable bars.

21. In a box making machine, in combination, a frame, a station located in said frame for setting up box blanks into box form, means associated with said setting up station and operative on box blanks at said station, means on said frame for supporting a supply of box blanks at a place spaced from said station, means for feeding box blanks from a supply thereof on said supporting means along a path of feed into registration with said station, a movable bar providing a support for said operative means, a fixed bar for supporting that end of said movable bar located adjacent to such supply on said supporting means, said fixed bar being located below said path of feed and perpendicular thereto to enable said movable bar and consequently said operative means to be adjusted relative to said line of feed, a driving member disposed in substantial parallelism to said fixed bar, and driven means connecting said driving member to said operative means, said driving member and driven means being constructed and arranged to maintain said operative means in driven relation to said driving member in any adjusted position of said movable bar on said fixed bar.

22. In a box making machine, in combination, means for making boxes from sheet material at a set up station, means for supporting a supply of sheet material at a place spaced from said station, driving mechanism for said box making means located between said station and said place of sheet material supply, guide means extending along the line of feed of the sheet material from said place of supply to said station and bridging the area occupied by said driving mechanism, and means located over the line of feed of the sheet material to advance a sheet of material fed from said place of supply toward said station along said guide means and over the area occupied by said driving mechanism, said advancing means comprising primary feeding means for moving a sheet over a substantial part of the length of said guide means, and supplementary feeding means engageable with the sheet while the latter is in motion and operable to move such sheet into registry with said box making means and said station.

23. In a box making machine, in combination, means for making boxes from sheet material at a set up station, means for supporting a supply of sheet material at a place spaced from said station, and means for feeding sheets of material from said place of supply thereof along a given path of feed to said station comprising three separate feed units acting in sequence on the sheets of material, the first of said units being constructed and arranged to feed sheets successively from said place of said supply to the second of said units, said second unit being constituted of a pair of continuously running feed rolls for moving the successive sheets along the major portion of said path of feed, and the third of said units comprising an endless element located over said path of feed and operable to come into engagement with a sheet in motion thereunder by said feed rolls without pause in the movements of said elements and sheet and to maintain such engagement, and to move in unison with the sheet as the latter advances along the remaining portion of said path of feed to said station.

24. In a box making machine, in combination, means for making boxes from sheet material at a set up station, means for supporting a supply of sheet material at a place spaced from said station, and means for feeding sheets of material from said place of supply thereof along a given path of feed to said station comprising means overlying said path of feed and constructed and arranged to move into engagement with a moving sheet traveling there below without interrupting the forward movement of the sheet and by such engagement to guide the sheet of material as it passes over said path of feed to said station.

25. In a box making machine, in combination, means for making boxes from sheet material at a set up station, means for supporting a supply of sheet material at a place spaced from said station, and means for feeding sheets of material from said place of supply thereof along a given path of feed to said station comprising a guide over which the sheet passes, an endless element located over said guide and said path of feed and having a generally horizontal run adapted to come into engagement with a moving sheet positioned thereunder without interrupting the forward movement of a sheet and coacting with said guide to confine such sheet as it moves along the length of said path of feed below said endless element toward said station.

26. In a box making machine, in combination, means for making boxes from sheet material at a set up station, means for supporting a supply of sheet material at a place spaced from said station, and means for feeding sheets of material from said place of supply thereof along a given path of feed to said station comprising means located over said path of feed and operable without interruption of the movement thereof and the forward movement of the sheet, to come into engagement with a moving sheet positioned thereunder and to continue such engagement with the moving sheet, said means maintaining such engagement for a substantial portion of the length of said path of feed and until such sheet is delivered to said station.

27. In a box making machine, in combination, means at a set up station for setting up box blanks into box form, means for applying stays to the corners of a box set up by said setting up means, a hopper for stacking box blanks spaced from said station, and means for feeding blanks from said hopper to said station including means for successively removing blanks from said hopper by engagement with the topmost blank in the stack thereof and feeding said blank over the top edge of said hopper between said hopper and said setting up means, and endless means located as a whole on one side of the path of movement of the blanks to the setting up means having a generally horizontal run between said hopper and said setting up means to advance blanks from said blank removing means to said setting up means.

28. In a box making machine, in combination, means at a set up station for setting up box blanks into box form, means for applying stays to the corners of a box set up by said setting up means, a hopper for stacking box blanks spaced from said station, and means for feeding blanks from said hopper to said station including stationary means for supporting the blanks in their travel to said station, means for successively removing blanks from said hopper by engagement with the topmost blank in the stack thereof and feeding said blank over the top edge of said hopper between said hopper and said supporting means and onto the latter, and movable guide means overlying said supporting means and the path of feed of the blanks from the hopper to said setting up means and operative to move into engagement with such blanks without interrupting the advancing movement thereof to confine successive blanks as they move from said hopper towards said setting up means.

29. In a box making machine, in combination, means at a set up station for setting up box blanks into box form, means for applying stays to the corners of a box set up by said setting up means, a hopper for stacking box blanks spaced from said station, and means for feeding blanks from said hopper to said station including means for supporting the blanks in their travel to said station, means for successively removing blanks from said hopper by engagement with the topmost blank in the stack thereof and feeding said blank over the top edge of said hopper between said hopper and said supporting means and onto the latter, and means adapted to come into engagement with the blanks moving along said supporting means and to continue such engagement of the blanks without interrupting the forward movement thereof so as to confine such blanks as they move along the length of such path of feed located below the range of operation of said confining means and until such confined blanks are delivered to said station.

30. In a box making machine, in combination, means for setting up box blanks in box form, means for supporting a supply of said box blanks, and means for feeding box blanks from said supporting means to said setting up means and including a pair of spaced rails associated with said setting up means and defining a portion of the path of feed of the blanks from said supply to said setting up means, a pair of feed rolls for ejecting a blank fed thereto from said supply upon said rails, movable means spaced above said rails and positioned over said path of blank feed so that said rails and movable means cooperate to provide a confining action on each blank as it travels from said feed rolls toward said setting up means, and means to drive said movable means in the direction of movement of the blanks on such path of feed thereof, successive portions of said moving means during such movement thereof coming into engagement with successive moving blanks without interrupting the forward movement imparted to such successive blanks by said feed rolls.

31. In a box making machine, in combination, a frame, a pair of supporting bars mounted on said frame and fixed on the latter in spaced relation, a pair of movable bars arranged in spaced relation, means movably supporting said movable bars on said fixed bars, means for setting up box blanks in box form located in an area defined by said fixed and movable bars, a hopper for stacking box blanks mounted on said frame at a place spaced from said setting up means and located outside of said defined area at a position adjacent to one of said fixed bars, and means for feeding box blanks from said hopper to said setting up means comprising guide rails mounted on said movable rails and spanning the distance between said hopper means and said setting up means and defining the path of feed of such blanks from one to the other, blank feeding means located outside said defined area and associated with said hopper, and blank feeding means located inside said defined area and associated with said guide rails.

32. A box making machine such as defined in claim 31, in which said feeding means includes a pair of feed rolls located adjacent to one side of said hopper and cooperable with said outside blank feeding means to feed blanks from said hopper upon said guide rails, said inside feeding means being cooperable to supplement the feed of the moving blanks by said feed rolls without interrupting the advancing movement of such blanks so as to deliver them to said setting up station.

33. A box making machine such as defined in claim 31, in which said inside feeding means includes movable means positioned between and above said guide rails so as to create a channel for the passage of a box blank therethrough, and means to drive said movable means in the direction of movement of the box blanks along said path of feed to cause it to move over said fixed bar positioned between said hopper and said setting up means and towards the latter.

References Cited in the file of this patent
UNITED STATES PATENTS

| | | |
|---|---|---|
| 1,164,922 | Caylor et al. | Dec. 21, 1915 |
| 2,185,652 | Spiess | Jan. 2, 1940 |
| 2,476,250 | Paulsen | July 12, 1949 |
| 2,646,983 | Pagendarm | July 28, 1953 |
| 2,890,630 | Bailey et al. | June 16, 1959 |
| 2,912,243 | Gulick | Nov. 10, 1959 |